United States Patent [19]

Chuang

[11] Patent Number: 5,275,777
[45] Date of Patent: Jan. 4, 1994

[54] METHOD FOR MAKING AN ELONGATED FOAM ROD WITH EMBEDDED STRING

[76] Inventor: Ming-Chih Chuang, No. 7, Chih-Lee 3rd Rd., Nan-King Industrial Dist., Nan-Tou City, Taiwan

[21] Appl. No.: 991,722

[22] Filed: Dec. 16, 1992

Related U.S. Application Data

[63] Continuation of Ser. No. 783,966, Oct. 29, 1991, abandoned.

[51] Int. Cl.⁵ .............................................. B29C 67/20
[52] U.S. Cl. ........................ 264/271.1; 264/275; 264/277; 264/279.1; 264/321
[58] Field of Search ................... 264/46.7, 46.4, 45.1, 264/321, 275, 271.1, 277, 279.1

[56] References Cited
U.S. PATENT DOCUMENTS

| | | | |
|---|---|---|---|
| 3,499,448 | 3/1970 | Jones | 264/321 |
| 3,758,916 | 9/1973 | Wetmore | 264/321 |
| 3,915,774 | 10/1975 | Dobson | 264/321 |
| 4,123,486 | 10/1978 | Sparks | 264/46.7 |
| 4,460,423 | 7/1984 | Bosnia | 264/46.7 |
| 4,533,588 | 8/1985 | Kraft | 264/321 |
| 4,764,238 | 8/1988 | Dastin et al. | 264/321 |
| 5,007,976 | 4/1991 | Satterfield et al. | 264/321 |

*Primary Examiner*—Allan R. Kuhns
*Attorney, Agent, or Firm*—Lowe, Price, LeBlanc & Becker

[57] ABSTRACT

A method is provided for producing an elongated foam rod with a string embedded therein. A plurality of strings is mounted to a frame under tension and each string is laid in a die with an elongate preformed piece of foam and the foam is then heated in the range 90°–100° C. at a pressure in the range 130–190 kg/cm² for 90 secs.

4 Claims, 7 Drawing Sheets

METHOD FOR MAKING AN ELONGATED FOAM ROD WITH EMBEDDED STRING

This application is a continuation of application Ser. No. 07/783,966 filed Oct. 29, 1991, now abandoned.

BACKGROUND OF THE INVENTION

1. Field of Invention

This invention relates to a method for making a foam rod which has a string therein, so that said foam rod has a better toughness and tensile strength and will not easily snap or break off as happened in the previous method.

2. Description of the Related Art

It is to be understood that the prior art method uses the same die as in the present invention. It has been found that the elongated foam rods (1,2) produced according to the prior art method are easily susceptible to cracks and snaps so that such elongated foam rods are not suitable for making slippers as shown in FIG. 1(A), which are often come under sprains and pulls and are only suitable for making bags as shown in FIG. 1(B). Thus there is a limited range of usage to the elongated foam rod of the prior art method.

SUMMARY OF THE INVENTION

The main object of the present invention is to provide a new method which will remedy the drawbacks of the elongated rod of the prior art method, providing numerous advantages which are not achievable by the prior art method.

An apparatus is used in the method of making an elongated foam rod according to the present invention. The apparatus includes a die having a stationary die element and a movable die which operatively confine a plurality of channels therebetween when both are clamped together to form the die. The die also has a pipe means through which a hot or cold water can pass in order to heat or cool the die and means for compressing the die after a foam piece is inserted into the die. The method includes the following steps: (1) forming a continuous foam sheet from a foam material; (2) cutting said continuous foam sheet into a plurality of foam pieces; (3) putting said foam piece on the movable die element, a frame with string means on the foam piece and another identical foam piece on the frame; (4) clamping the die elements by said compressing means together and passing the hot water through the pipe means to heat the die; (5) cooling the heated die by passing cold water through the pipes; (6) opening the die to take out the frame upon which a plurality of elongated foam rods are formed; and (7) disconnecting the string means from the frame to obtain the plurality of elongated foam rods, each of which has a string embedded therein.

BRIEF DESCRIPTION OF THE DRAWINGS

Other features and advantages of the present invention will become apparent in the following detailed description, including drawings, all of which shows a non-limiting form of the present invention, and of which.

DETAILED DESCRIPTION OF THE PREFERRED EMBODIMENT

Figure 1A:
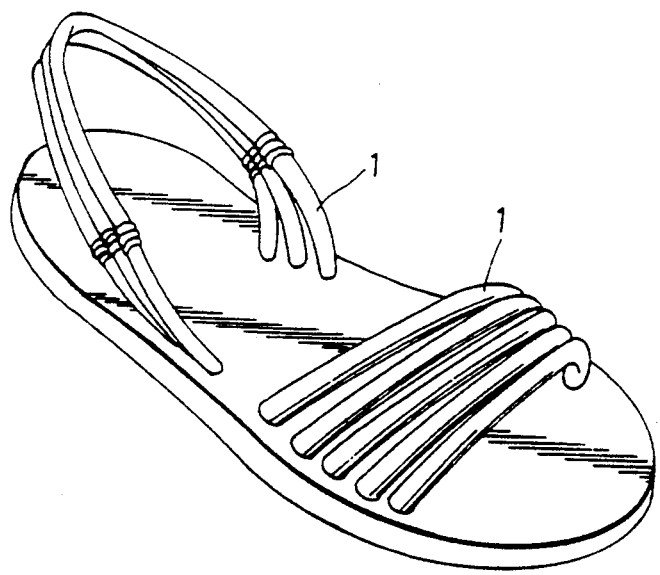
FIGS. 1(A), 1(B) show two items made from the elongated foams rod of the prior art method.
Figure 1B:
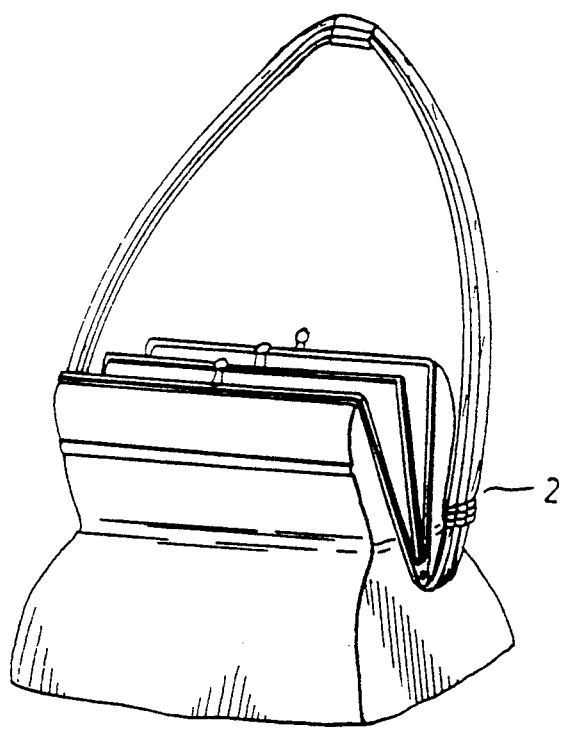
Figure 2:
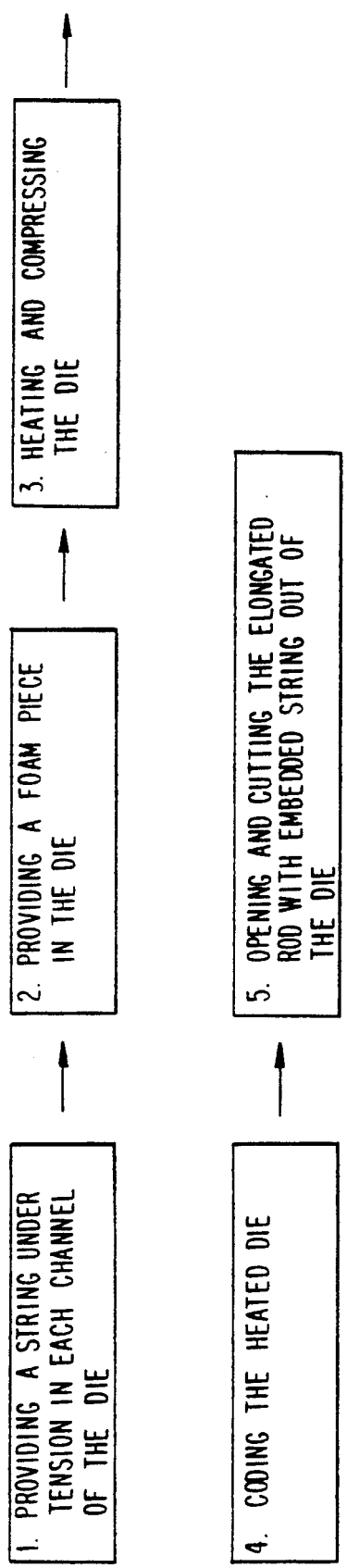
FIG. 2 shows a block diagram of the method for forming an elongated foam rod according to the present invention.

The apparatus (30) for forming a plurality of foam rods by using a frame (20) with string means (21) includes a die that has a stationary die element (31) and a movable die element (32) which is movable in a first position where said movable die element is away from said stationary die element so that said die is in an open configuration, allowing a foam piece to be inserted therein, and a second position where said movable die element and said stationary die element are clamped together to form said die. It is important to observe that while the two die elements are in a clamped configuration, they form a plurality of channels (321) therebetween.

Another thing to note is that since each die element also has a pipe means (312,322) provided within, hot or cold water can pass through the pipe means (312,322) thereby heating or cooling the die. Since the apparatus (30) further has a hydraulic compression means (40) attached to the movable die element (32), the die can be compressed during the heating or cooling operation.

The frame (20) is a rectangular one and has a plurality of strings (21) provided from one side to another in a parallel manner and under tension. The method of the present invention includes the following steps:

(1) Forming a continuous foam sheet from a suitable foam material, the thickness of which can be made in accordance with one's desire.

Figure 3:
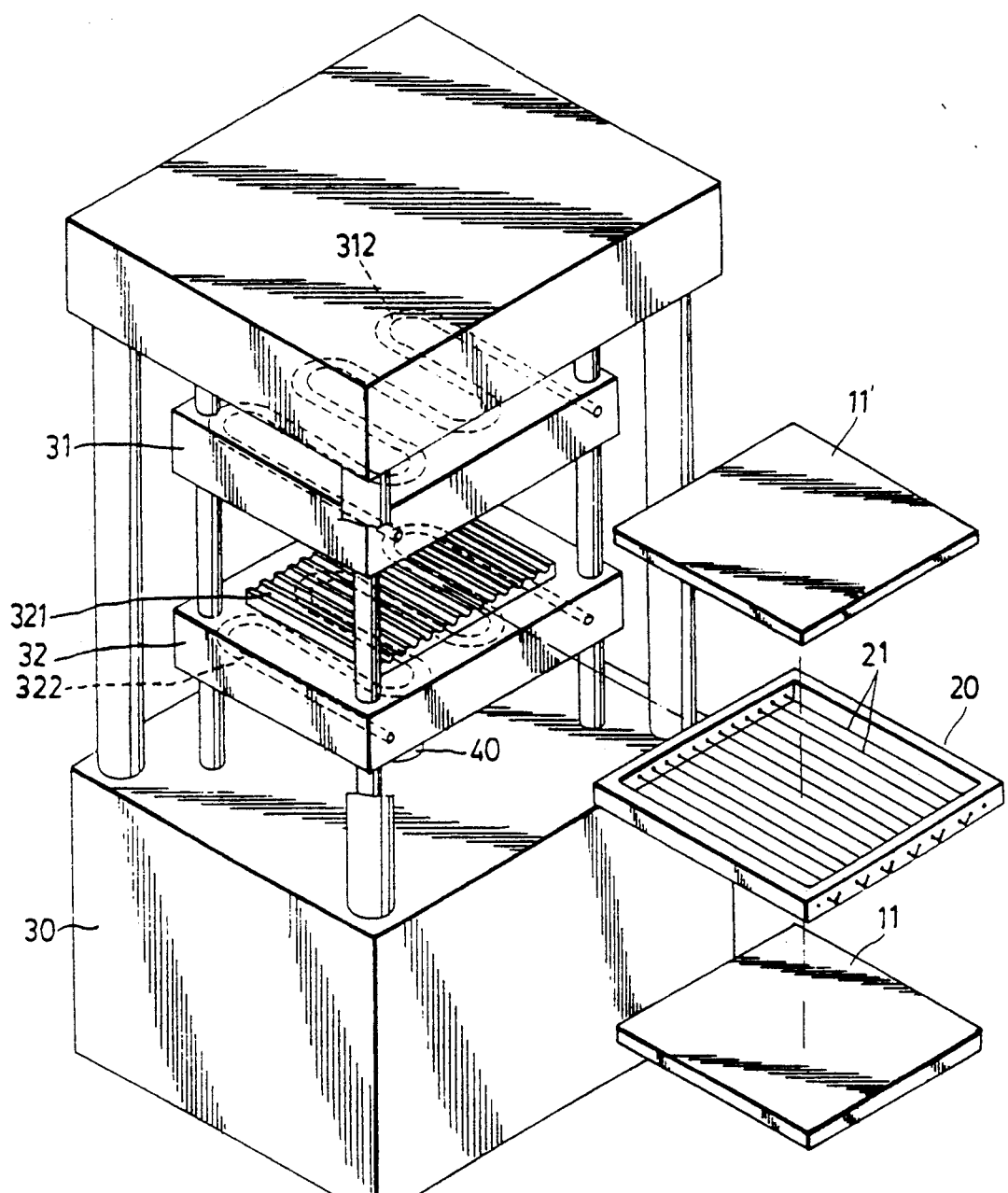
FIG. 3 shows an apparatus, a foam piece and a frame with string means which form a plurality of elongated foam rods according to the method of the present invention.
Figure 5:
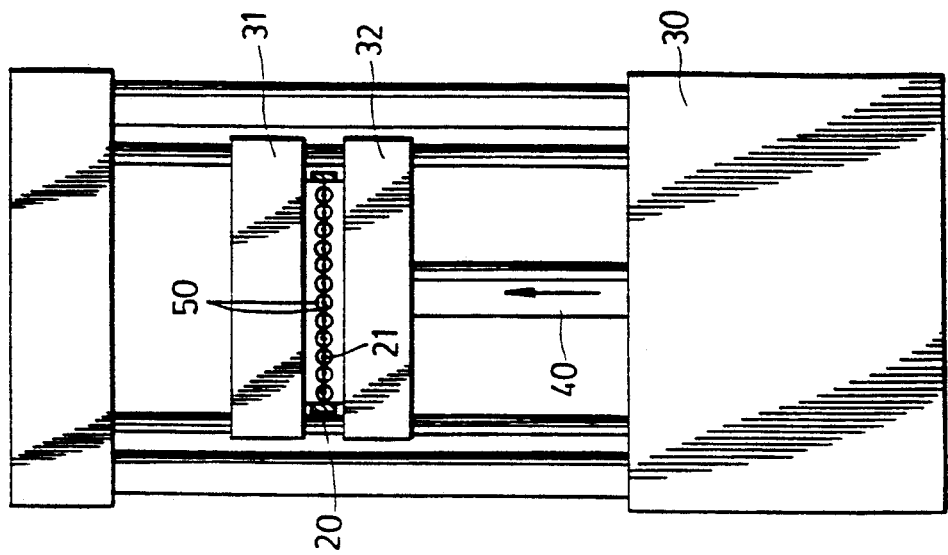
FIG. 5 shows the preferred embodiment of the present invention being treated by a compressing means, heating means and later cooling means according to the method of the present invention.

(2) Cutting said continuous foam sheet into a plurality of foam pieces (11), as seen in FIG. 3, each of which have a predetermined width, length and thickness. It is to be understood that the width, length and thickness of each foam piece can fit properly in the die cavity and, when formed, will provide a minimum waste of the foam material.

Figure 4:
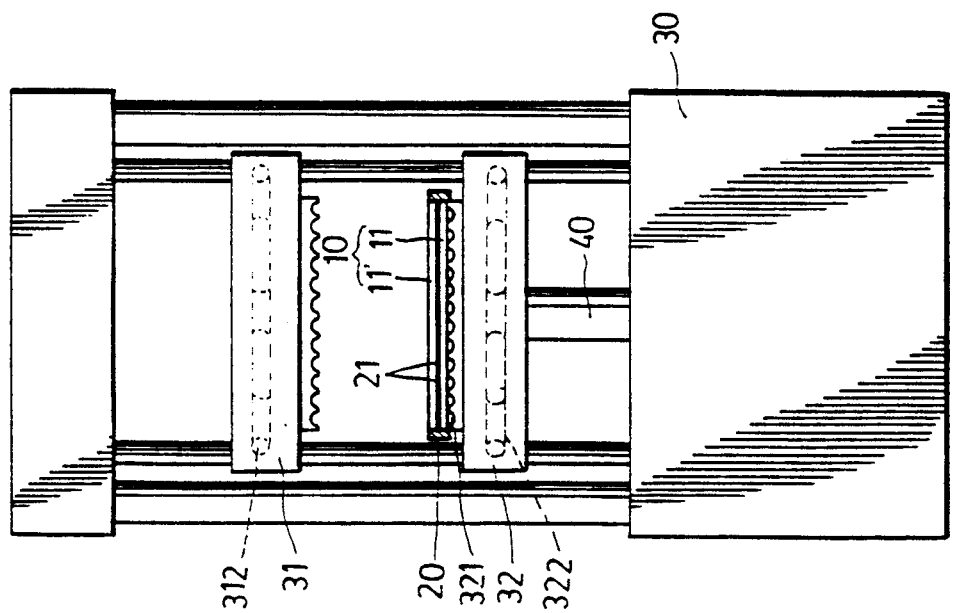
FIG. 4 shows the preferred embodiment of the present invention, which is provided on a die piece according to the method of the present invention.

(3) Putting said foam piece (11) on the movable die element (32), while said frame (20) with string means (21) is placed on said foam piece. Another said foam piece (11') is placed on top of the frame (20), as shown in FIG. 4. Under this condition, each string exists in each channel of the die under tension.

(4) Moving the movable die element (32) towards the stationary die element (31) by means of said compression means (40), which is attached to the movable die element, thereby compressing the die assembly. The compression force is usually between 130–160 kg/square cm. Under this condition, the two die elements are clamped together due to the compression force. The die is compressed for about 90 seconds. Water, usually heated 95 to 100 degrees centigrade, is passed through the pipe means (312,322) so that the whole die, the foam pieces and the frame are heated while the foam pieces (11,11") are formed into a plurality of foam rods (50), each with a single string therein in the channels (321) of the die. It is important to note here that the frame with string means is unaffected by heating, only the foam pieces are disintegrated therefore, an elongated foam rod is formed in each channel of the die. The compression force and time can be varied according to the thickness of the foam pieces.

(5) Cooling down the heated die by letting cold water pass through said pipe means. The cold water usually has a temperature of 20 degrees centigrade.

Figure 6:
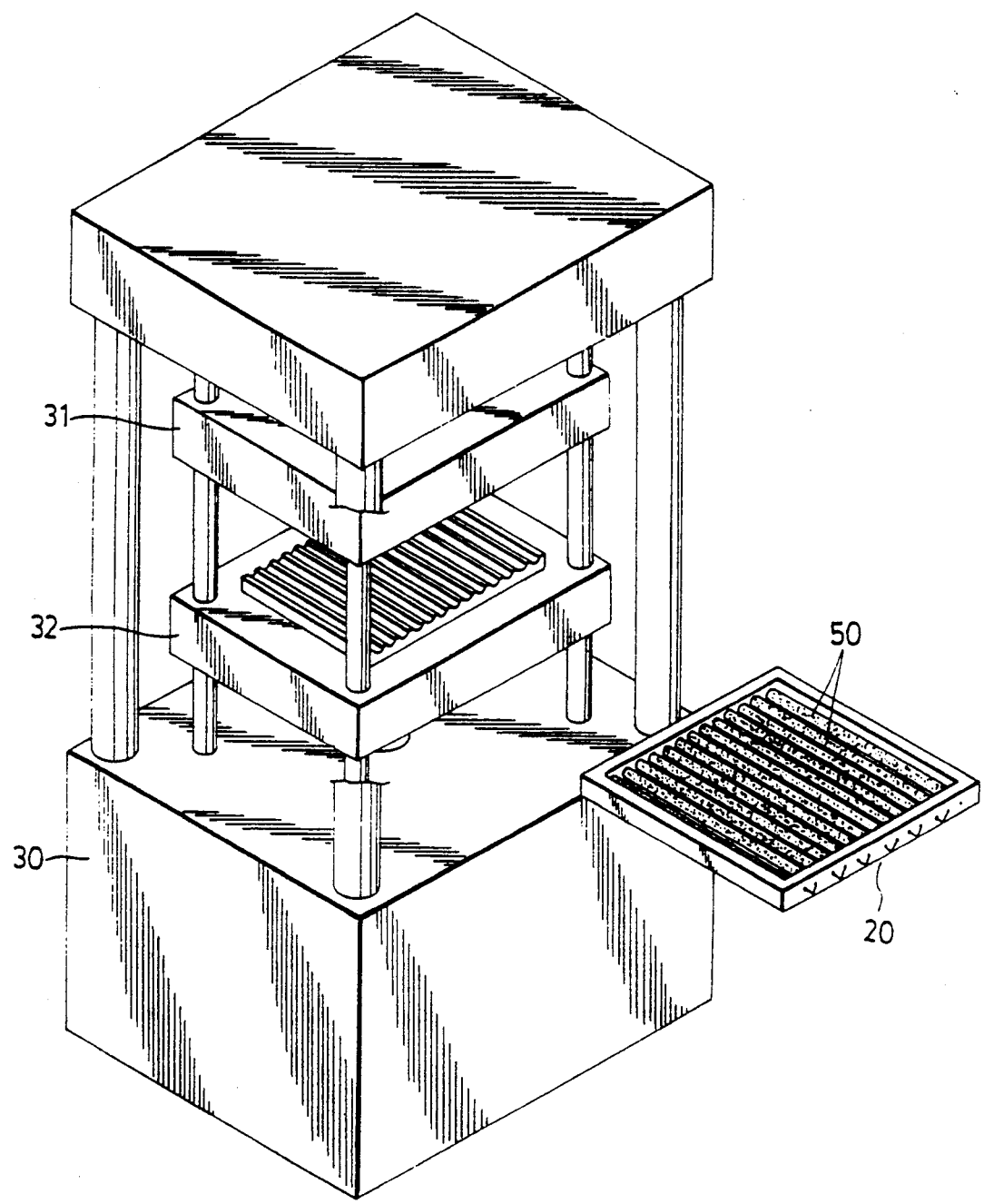
FIG. 6 shows the preferred embodiment of the present invention after treatment according to the method of the present invention.

(6) Opening said die and moving said movable die element away from said stationary die element and taking out said frame, whereon a plurality of foam rods (50) are formed as shown in FIG. 6.

Figure 7:
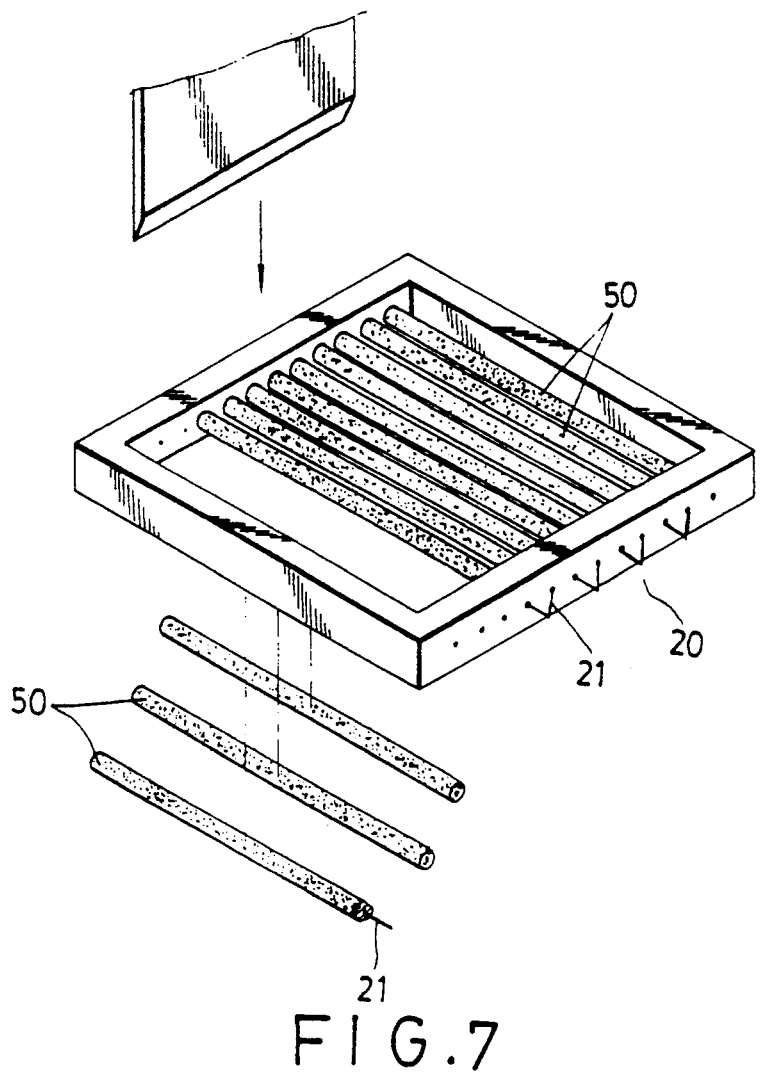
FIG. 7 shows the elongated foam rods produced according to the method of the present invention.

(7) Disconnecting the string means (21) from said frame (20), wherein each of the elongated foam rods contains a string embedded within, as shown in FIG. 7.

Figure 8:
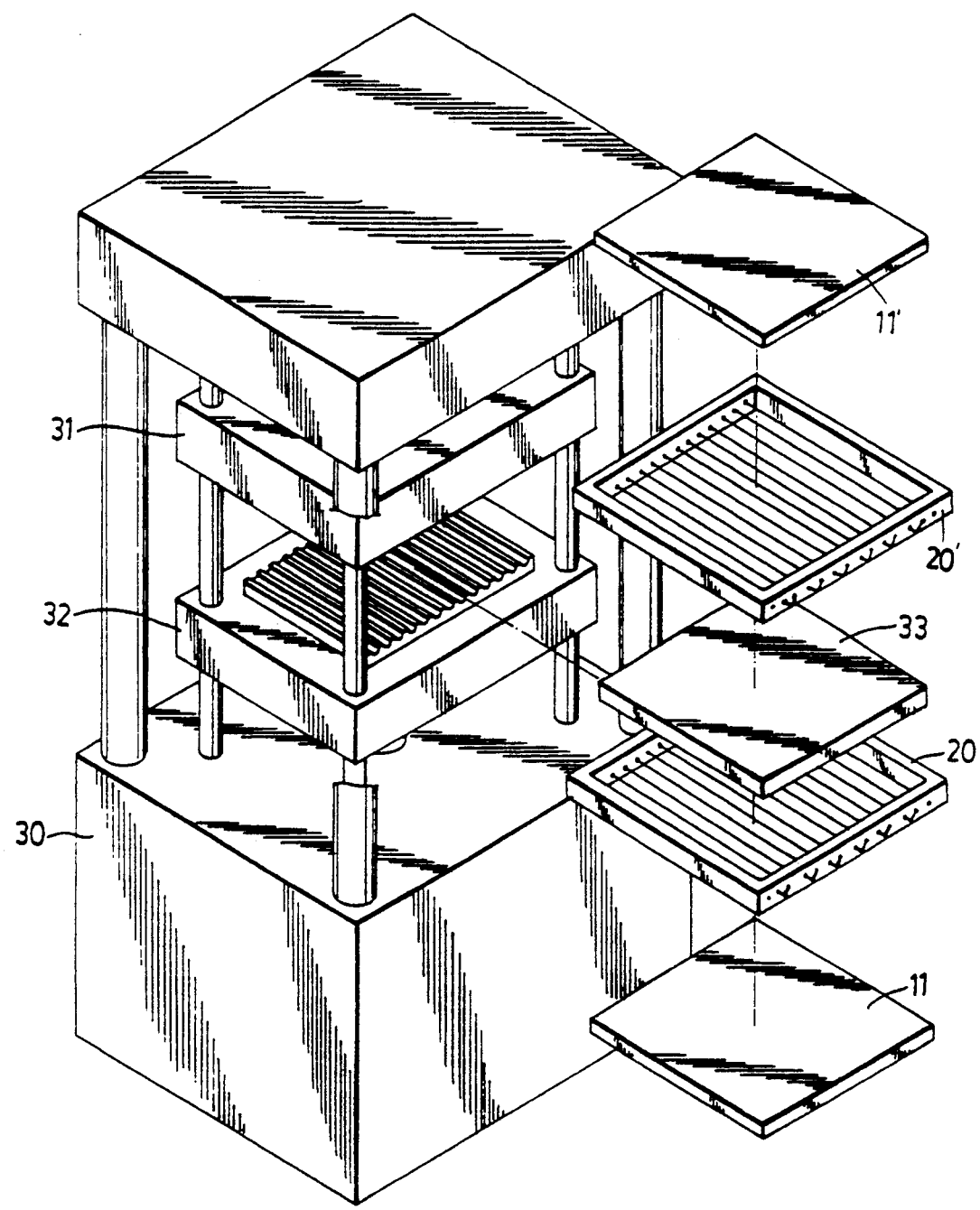
FIG. 8 shows a second embodiment according to the method of the present invention.

Referring to FIG. 8, in one preferred embodiment, two frame (20,20') each have a string means and a partition plate (33) placed between said two frames in order to make the two foam pieces (11,11") into a plurality of elongated foam rods in the above-mentioned manner.

The strings are usually made of cotton or nylon material so that an elongated foam rod made with one will not be susceptible to cracks and snaps as is the elongated foam rod produced by the prior method. This is the most unique distinction of the present invention.

With the invention thus explained, it is obvious to those skilled in the art that several modifications and variations can be made without departing from the scope and spirit of the present invention. It is therefore intended that this invention be limited only as in the appended claims.

I claim:

1. A method for making elongated foam rods each with a string embedded therein from preformed foam material compressed in a die, wherein the die includes a stationary die element and a movable die element movable relative thereto, the stationary and movable die elements each being formed to have cooperating channels for forming a plurality of cavities when the stationary and movable die elements are clamped together to form a complete die, comprising the steps of:
   preforming a plurality of pieces of foam material, each to a predetermined shape and size selected to enable each preformed foam piece to fit into one of said cavities of said die when placed therein;
   positioning said preformed foam pieces in respective channels of said movable die element;
   positioning a plurality of strings on a movable frame, under tension and parallel to one another in correspondence with said channels, and moving the frame to put said strings on corresponding pieces of said preformed foam positioned on said movable die;
   moving the movable die to said stationary die, so as to enclose therein said preformed foam pieces and strings within cavities formed between said cooperating channels, and simultaneously heating and holding said die elements together compressively to bond said preformed foam elements to respective strings and to embed the respective strings therein to form said elongated foam rods;
   cooling said heated die; and
   moving said movable die element, and cutting said elongated foam rods from said frame with respective strings embedded in said foam rods.

2. The method according to claim 1, wherein:
   said plurality of preformed foam pieces are cut from a larger preformed foam piece.

3. The method according to claim 1, wherein:
   said stationary and movable die elements are held together during said heating and compressing step at a temperature in the range 95°-100° C. for approximately 90 seconds.

4. The method according to claim 1, wherein:
   said step of cooling said die comprises the step of passing cold water at a temperature of approximately 20° C. through said stationary and movable die elements.

* * * * *